United States Patent [19]

Kusano

[11] Patent Number: 5,568,226
[45] Date of Patent: Oct. 22, 1996

[54] POWER SUPPLY DEVICE HAVING CONTROL TRANSISTORS CONNECTED IN PARALLEL WITH OUTPUT VOLTAGE TERMINALS

[76] Inventor: Akihisa Kusano, c/o Canon Kabushiki Kaisha, 30-2, 3-chome, Shimomaruko, Ohta-ku, Tokyo, Japan

[21] Appl. No.: 243,931

[22] Filed: May 17, 1994

[30] Foreign Application Priority Data

May 20, 1993 [JP] Japan ..................... 5-118413

[51] Int. Cl.⁶ .......................... G03G 15/00; G03G 21/00
[52] U.S. Cl. .......................................... 355/200; 323/289
[58] Field of Search ............................ 355/200; 323/289, 323/903

[56] References Cited

U.S. PATENT DOCUMENTS 4,638,240  1/1987  Pauker et al. .................. 323/289
4,670,667  6/1987  Petit ................................. 307/254
4,887,198  12/1989  Lee ............................. 323/289 X
4,891,572  1/1990  Suzuki ............................ 323/903

*Primary Examiner*—Fred L. Braun
*Attorney, Agent, or Firm*—Fitzpatrick, Cella, Harper & Scinto

[57] ABSTRACT

A power supply device converts an input voltage to a transformer to high output voltages at a secondary side. A transistor is connected in parallel with each of two or more series-connected high voltage output circuits of different polarities on the secondary side. The base currents of the transistors paralleled with the output circuits are controlled so that the high voltage output can be continuously varied.

10 Claims, 5 Drawing Sheets

POWER SUPPLY DEVICE HAVING CONTROL TRANSISTORS CONNECTED IN PARALLEL WITH OUTPUT VOLTAGE TERMINALS

BACKGROUND OF THE INVENTION

1. Field of the Invention

The present invention relates to a power supply device, and more particularly to a power supply device of a high output voltage adapted for use in an image forming apparatus, such as a copying apparatus or a printer, utilizing the electrophotographic process.

2. Related Background Art

FIGS. 5 and 6 are circuit diagrams showing different examples of conventional power supply devices.

In an example shown in FIG. 5, there are provided a high-voltage transformer 181; transistors 182, 183, 184; an operational amplifier 185; drivers 186, 187 respectively for the transistors 182,183; load current detecting means 189; and a control circuit 188 for supplying the operational amplifier 185 with a level signal and the drivers 186, 187 with clock signals of inverted phases, in response to a signal from the current detecting means 189. There are also provided high-voltage diodes 190,191; high-voltage capacitors 192, 193; a load 194; and a high-voltage relay 195.

The conventional example mentioned above functions in the following manner. This circuit effects constant-current control on high output voltages of positive and negative polarities. When the transistor 183 is turned on, a positive high voltage is generated at the secondary side of the transformer 181 to turn on the high-voltage diode 191, thereby charging the high-voltage capacitor 193 with a positive high voltage. On the other hand, when the transistor 182 is turned on, a negative high voltage is generated at the secondary side of the transformer 181 to turn on the high-voltage diode 190, thereby charging the high-voltage capacitor 192 with a negative high voltage.

The polarity of the high voltage applied to the load 194 is switched by the high-voltage relay 195. Then, depending on the signal from the current detecting means 189, the control means 188 varies the signal supplied to the operational amplifier 185, thus regulating the voltage applied to the transformer 181 through the transistor 184. Thus the current in the load 194 is controlled at a predetermined value in this manner.

In the circuit diagram in FIG. 6, showing another conventional example, there are provided high-voltage transformers 201, 202; transistors 203, 204; oscillators 205, 206; control means 207 for terminating the oscillation of the oscillator 205 or 206 according to the polarity of the high output voltage; high-voltage diodes 208, 209; high-voltage capacitors 210, 211; resistors 212, 213; a load 214; and diodes 220, 221.

Referring to FIG. 6, the transformers 201, 202 respectively generate positive and negative high voltages. The polarity of the high voltage supplied to the load 214 is switched according to whether the control means 207 causes oscillation in the oscillator 205 or 206.

The conventional example shown in FIG. 5 requires the expensive high-voltage relay 195 for switching the polarity of the output high voltage, thus leading to a significantly elevated cost. Also if there are required different voltage levels at the positive and negative sides, there are required not only the high-voltage relay but also plural units of expensive high-voltage transformers. Consequently such structure is unfavorable not only in terms of the cost but also in terms of the space required.

On the other hand, the conventional example shown in FIG. 6 does not require the high-voltage relay for the polarity switching, but always requires plural high-voltage transformers even in case of generating positive and negative high voltages of a same magnitude. Consequently the structure becomes complex and bulky, leading again to an elevated cost.

SUMMARY OF THE INVENTION

The object of the present invention is to provide a power supply device capable of generating high voltages of both polarities without the above-mentioned drawbacks of the prior art.

According to an embodiment of the present invention, the power supply device, for elevating an input voltage at the primary side with a transformer to provide high output voltages at the secondary side, comprises transistors connected in parallel manner between high-voltage output terminals of plural high-voltage output circuits of different polarities, formed at the secondary side of a same transformer, and base current control means for controlling the base currents of said transistors, wherein said plural high-voltage outputs are connected in series.

The above-explained configuration enables supply of a high voltage, as plural high-voltage output circuits of different polarities, formed at the secondary side of the same transformer, are connected in series. In addition, the high-voltage output can be continuously varied from positive side to negative side, by means of transistors connected in parallel between the high-voltage output terminals of the plural high-voltage output circuits and the base current control means for controlling the base currents of said transistors.

Other objects of the present invention, and the features thereof, will become fully apparent from the following detailed description, which is to be taken in conjunction with the attached drawings.

DESCRIPTION OF THE PREFERRED EMBODIMENTS

Now the power supply device of the present invention will be clarified by embodiments thereof.

[1st embodiment]

Figure 1:
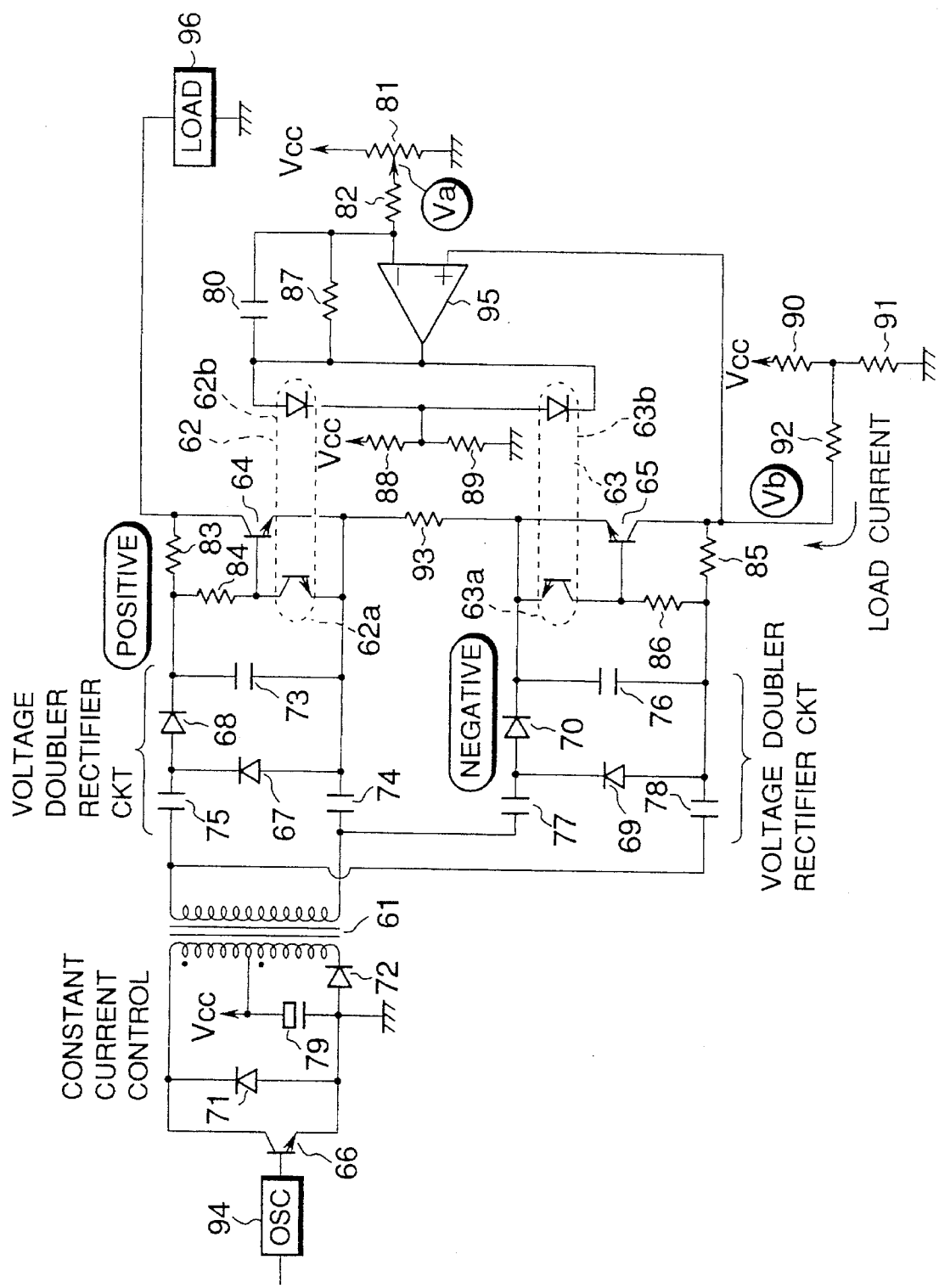
FIG. 1 is a circuit diagram of a first embodiment.

FIG. 1 is a circuit diagram of a first embodiment, wherein provided are a high-voltage transformer 61; photocouplers 62, 63; high-voltage transistors 64, 65; a transistor 66; high-voltage diodes 67–70; diodes 71, 72; high-voltage capacitors 73–78; capacitors 79, 80; a variable resistor 81; resistors 82–93; an oscillator 94; an operational amplifier 95; and a load 96.

The above-mentioned circuit functions in the following manner. The on-off operation of the transistor 66 in response to a signal from the oscillator 94 generates a high-voltage rectangular wave at the secondary side of the transformer 61. The diode 72 is provided for stabilizing the voltage generated at the secondary side of the transformer 61 when the transistor 66 is turned off. The two coils in the primary side of the transformer 61 have a same number of turns.

In the secondary side, a positive voltage generating circuit is constituted by the transistor 64, photocoupler 62-a, high-voltage diodes 67, 68, high-voltage capacitors 73, 74, 75 and resistors 83, 84. Also a negative voltage generating circuit is constituted by the transistor 65, photocoupler 63-a, high-voltage diodes 69, 70, high-voltage capacitors 76, 77, 78 and resistors 85, 86. Each of said circuits is composed of a voltage doubling rectifier circuit employing high-voltage capacitors and high-voltage diodes, and a voltage control circuit employing a transistor, resistors and a photocoupler. The resistor 93 is provided for separating the AC components, in order to avoid mutual interference of the voltage doubling rectifier circuits of positive and negative voltages.

In the following there will be explained the control circuit on the secondary side. The variable resistor 81 is provided for setting the current to be supplied to the load, and the resistors 90–92 constitute a load current detecting circuit. A circuit composed of the operational amplifier 95, resistors 82, 87 and capacitor 80 constitutes an inverting amplifier for controlling the output current to the load, according to the output voltage Va of the variable resistor 81, thus providing the load with a negative or positive current respectively if Va is large or small.

For example if the detected voltage Vb is larger than Va, the output voltage of the operational amplifier becomes larger as the non-inverted input thereof is larger. If the photocoupler 62 is turned on in this state, the forward current of the photocoupler 62-b increases further, whereby the collector current of the transistor 64 decreases and the positive high voltage increases. On the other hand, if the photocoupler 63 is turned on, the forward current of the photodiode 63-b becomes smaller, whereby the collector current of the transistor 65 increases and the negative high voltage decreases. In either case, the high output voltage increases in the positive direction, so that the load current also increases in the positive direction and Vb becomes smaller. Thus the circuit always functions in such a manner that Vb becomes equal to Va.

As will be apparent from the circuit diagram, only either one of the photodiodes 62-b, 63-b can be turned on at a time and only a high voltage corresponding to the turned-on photodiode is released.

If the turn-on current of the photodiode increases, the base current of the corresponding high-voltage transistor decreases, so that the collector voltage of the high-voltage transistor increases and the corresponding high-voltage output increases also. On the other hand, if the turn-on current of the photodiode decreases, the base current of the corresponding high-voltage transistor increases, so that the collector voltage thereof decreases and the corresponding high-voltage output decreases also.

On the other hand, as there is no current in the phototransistor corresponding to the turned-off photodiode, the corresponding high-voltage transistor is completely turned on. Consequently the corresponding high output voltage is shortcircuited by said high-voltage transistor.

As explained in the foregoing, the present embodiment provides a high-voltage power supply device, capable of varying the output current in continuous manner from positive side to negative side, in easy and inexpensive manner, employing a single transformer and with the high-voltage relay.

[2nd embodiment]

Figure 2:
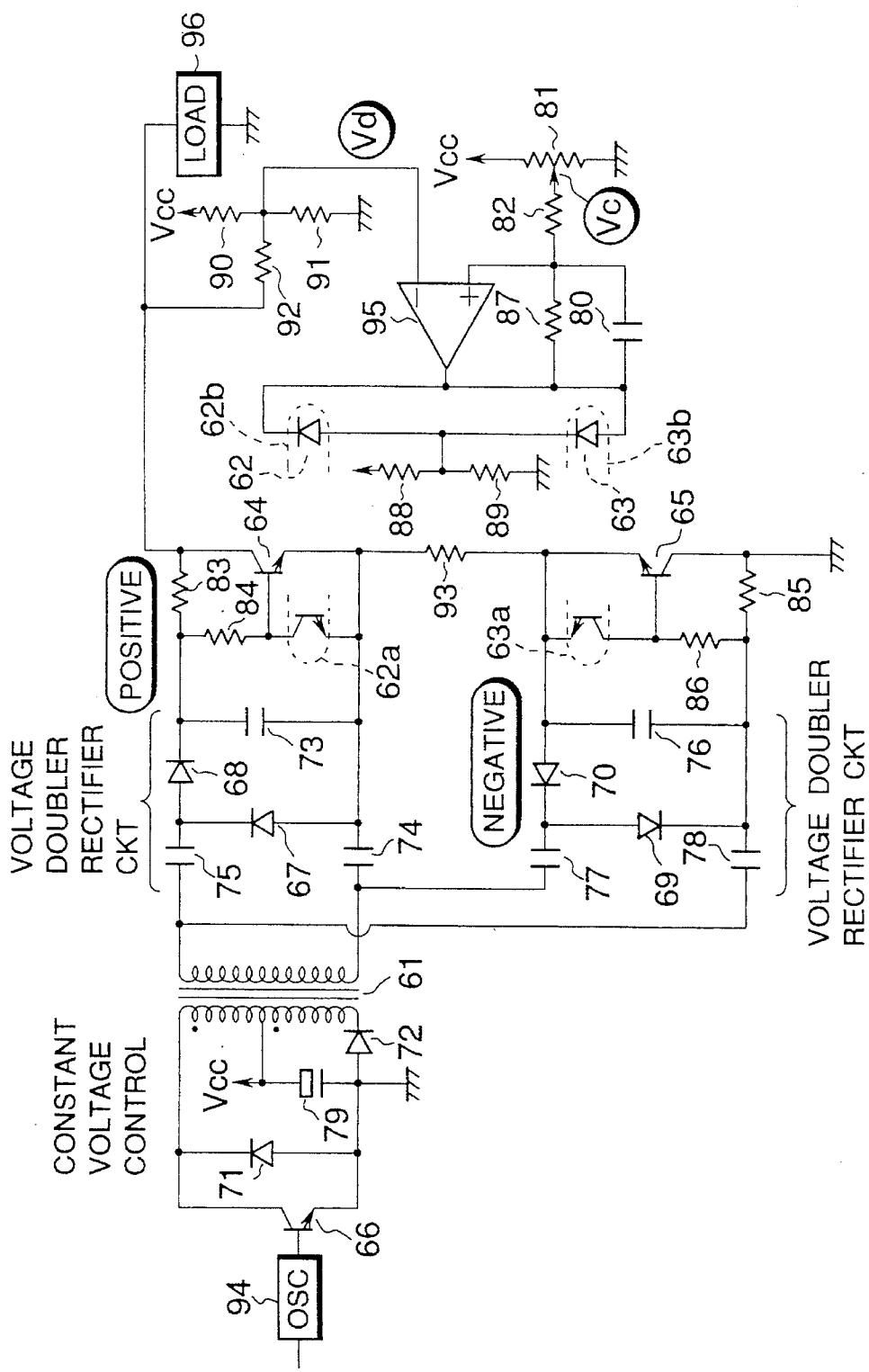
FIG. 2 is a circuit diagram of a second embodiment.

FIG. 2 is a circuit diagram of a second embodiment, wherein components same as or equivalent to those in the first embodiment are represented by same numbers.

In contrast to the first embodiment for constant current control, the present second embodiment is designed for effecting constant voltage control.

Referring to FIG. 2, resistors 90–92 constitute an output voltage detecting circuit, providing a detection voltage signal Vd. A variable resistor 81 is provided for setting a target value Vc for the constant voltage control. Photodiodes 62-b, 63-b are connected oppositely in comparison with the first embodiment, because the detected voltage Vb in the first embodiment becomes smaller as the high output voltage increases, while the detected voltage Vd in the present second embodiment becomes larger as the high output voltage increases. Other parts will not be explained further as they are same as those in the first embodiment.

As explained in the foregoing, also in the constant voltage controlling configuration, there can be provided a high-voltage power supply device, capable of varying the output voltage in continuous manner from the positive side to the negative side, in easy and inexpensive manner, employing only a single transformer without the high-voltage relay.

[3rd embodiment]

Figure 3:
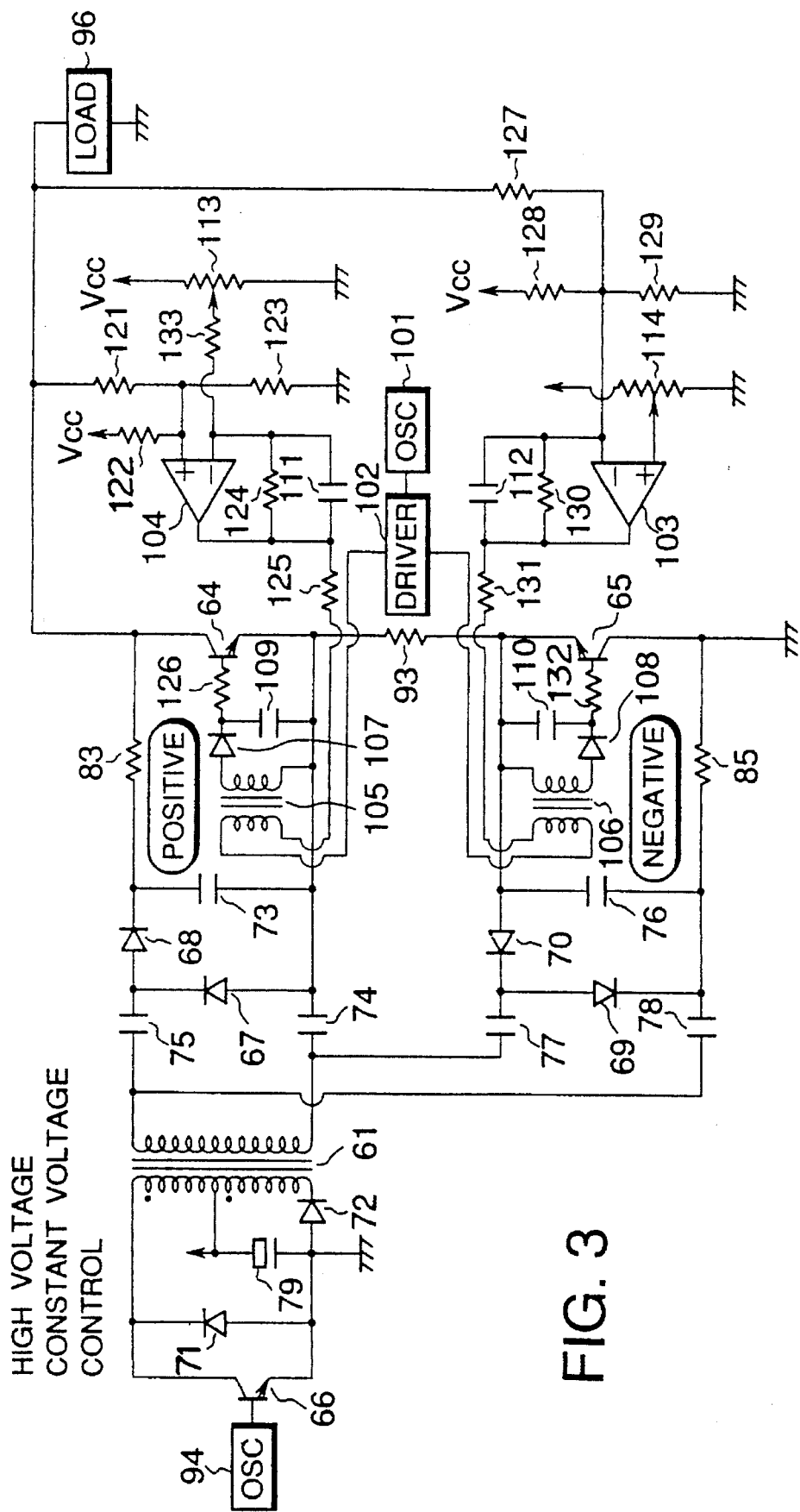
FIG. 3 is a circuit diagram of a third embodiment.

FIG. 3 is a circuit diagram of a third embodiment, wherein components same as or equivalent to those in the first or second embodiment are represented by same numbers and will not be explained further.

In contrast to the first or second embodiment which employs photocouplers for controlling the base currents of the transistors, the present third embodiment employs pulse transformers for this purpose.

Referring to FIG. 3, there are provided an oscillator 101; a driver 102; operational amplifiers 103, 104; pulse transformers 105, 106; diodes 107, 108; capacitors 109–112; variable resistors 113, 114; and resistors 121–133.

A control circuit for controlling the positive high voltage is constituted by the operational amplifier 104, pulse transformer 105, diode 107, capacitors 109, 111, variable resistor 113, resistors 121–126 and 133. Also a control circuit for controlling the negative high voltage is constituted by the operational amplifier 103, pulse transformer 106, diode 108, capacitors 110, 112, variable resistor 114, and resistors 127–132. Also an output voltage detecting circuit is constituted by the resistors 121–123 and 127–129. The variable resistor 113 is provided for setting the positive output voltage, while the variable resistor 114 is provided for setting the negative output voltage.

The above-explained circuit functions in the following manner.

For releasing the positive high voltage, the variable resistor 114 has to be shifted to the high-side end, whereby the output voltage of the operational amplifier 103 becomes higher to increase the voltage supplied to the pulse transformer 106. The pulse transformer 106 is switched by the driver 102, based on a signal from the oscillator 101, thereby generating a voltage also on the secondary side, thus turning on the transistor 65. Thus the negative high output voltage is shortcircuited through the resistor 85 and is therefore not released.

If the variable resistor 113 is adjusted to a desired level in this state, the operational amplifier 104 effects control in such a manner that the detected value of the output voltage detecting circuit composed of the resistors 121–123 becomes equal to said adjusted value.

For example, if the detected value is larger than the set value, the non-inverted input of the operational amplifier 104 becomes larger so that the output voltage thereof increases. In response the input voltage to the pulse transformer 105 is elevated, thereby increasing the voltage generated at the secondary side thereof and also increasing the base current of the transistor 64. Since the positive high output voltage is so connected as to be shortcircuited by said transistor through the resistor 83, the collector voltage (positive high output voltage) of the transistor 64 becomes smaller. In this manner the high output voltage is controlled to the desired value.

For releasing the negative high voltage, the variable resistor 113 has to be set at 0. In this state the inverted input of the operational amplifier 104 becomes smaller than the non-inverted input, thereby increasing the output voltage of said operational amplifier 104. In response the voltage at the secondary side of the pulse transformer 105 increases to turn on the transistor 64. Consequently the positive high output voltage is shorted circuited by the transistor 64 through the resistor 83 and is no longer released.

If the variable resistor 114 is adjusted to a desired value in this state, the negative high output voltage is controlled in the same manner as in case of the positive high output voltage.

As explained in the foregoing, the present embodiment also provides a high-voltage power supply device, capable of varying the output voltage in a continuous manner from the positive side to the negative side, in an easy and inexpensive manner, employing only one transformer without the high-voltage relay.

[4th embodiment]

Figure 4:
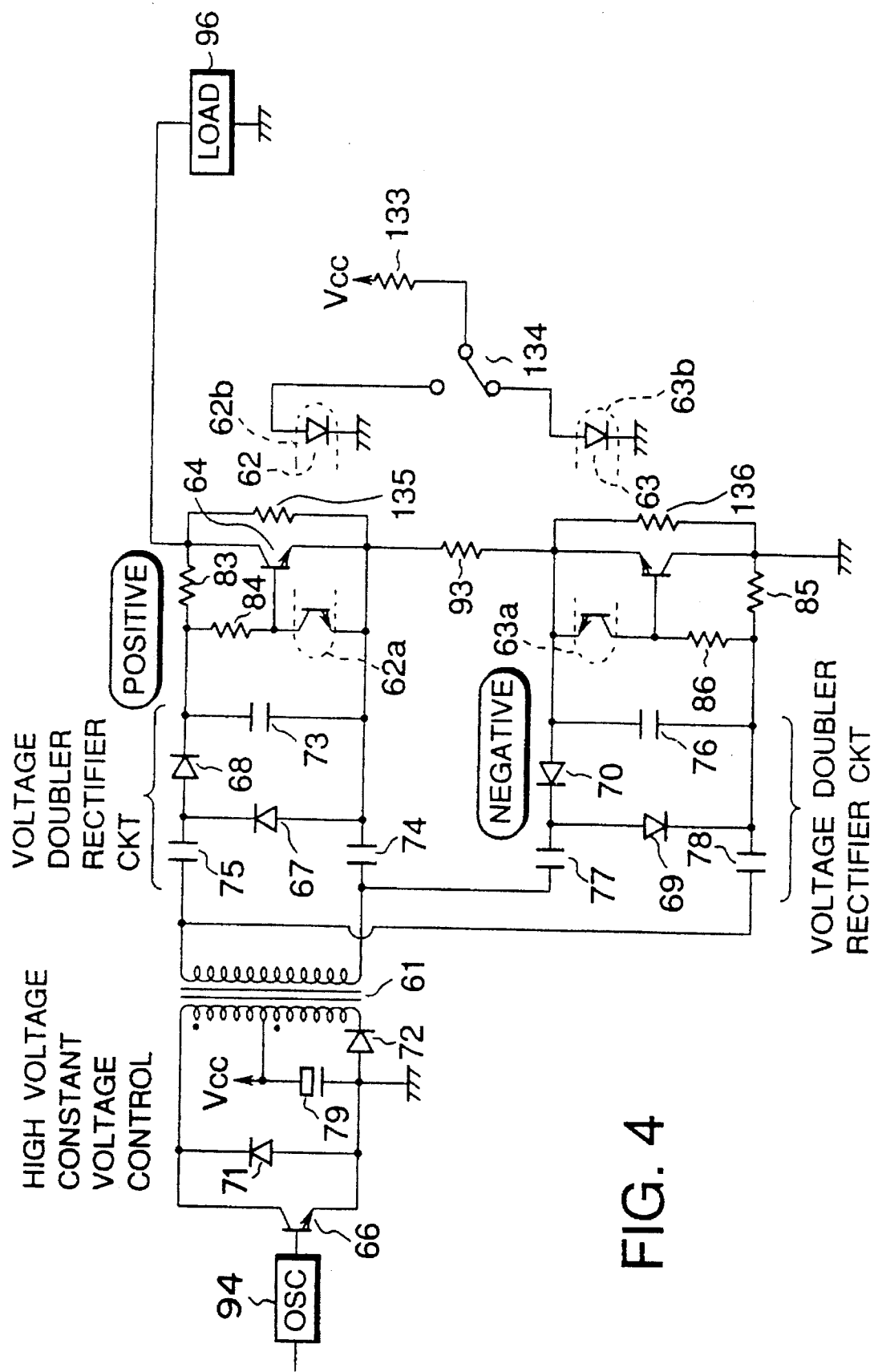
FIG. 4 is a circuit diagram of a fourth embodiment.
Figure 5:
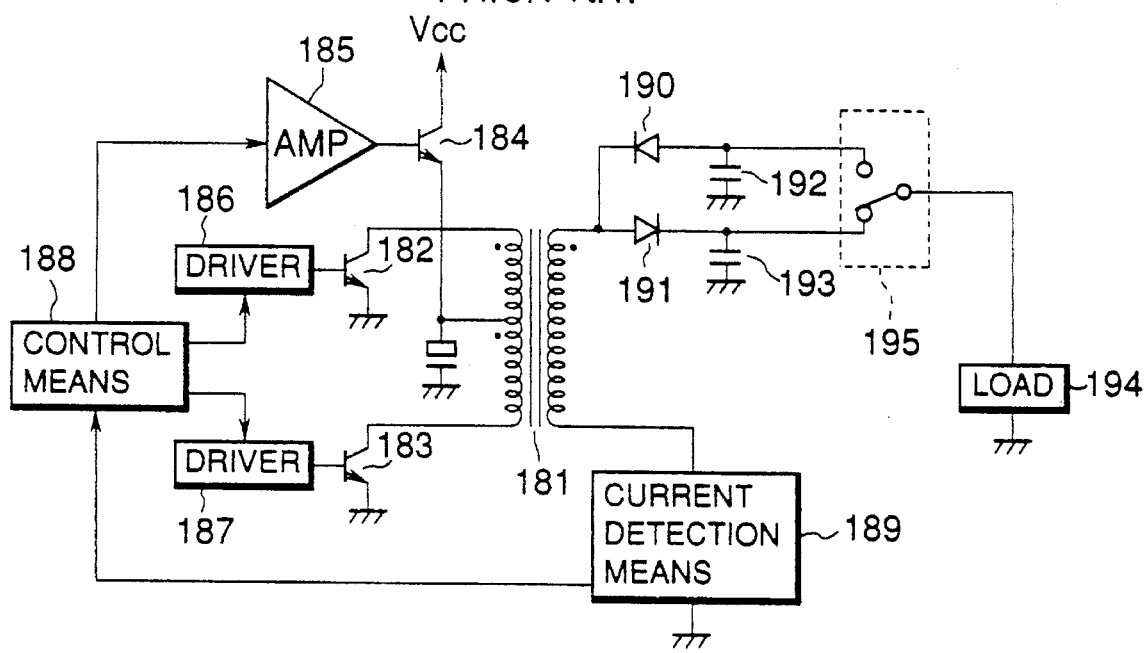
FIG. 5 is a circuit diagram of a conventional power supply device.
Figure 6:
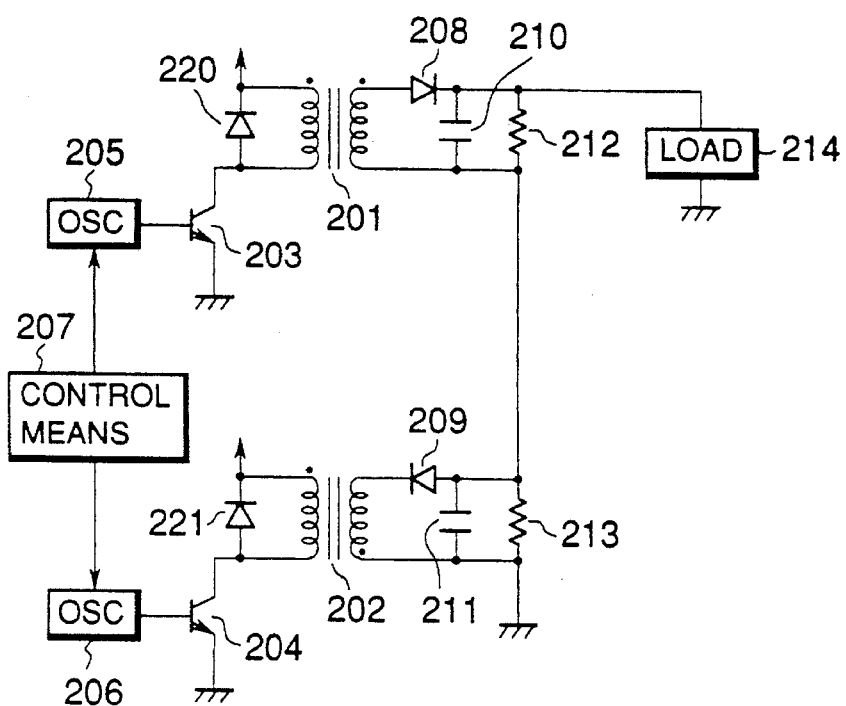
FIG. 6 is a circuit diagram of another conventional power supply device.

FIG. 4 is a circuit diagram of a fourth embodiment, in which components same as or equivalent to those in the first to third embodiments are represented by same numbers and will not be explained further.

In contrast to the foregoing first to third embodiments which are designed to continuously vary the output voltage, the present embodiment is only capable of switching positive or negative output. However, since high voltages of different magnitudes (absolute values) are provided by a same transformer, the positive high output voltage is regulated by voltage division with resistors 83, 135, while the negative high output voltage is regulated by voltage division with resistors 85, 134. The basic function will not be explained further as it is same as that in the foregoing embodiments.

A very simple configuration as in the present embodiment can be employed if only a constant output voltage is required.

As explained in detail in the foregoing embodiments, the present invention can provide a high-voltage power supply device by serial connection of plural high-voltage output circuits of different polarities, formed on the secondary side of a same transformer. In addition, the output current can be varied in a continuous manner from the positive side to the negative side, by means of transistors connected in parallel between the high-voltage output terminals of the plural high-voltage output circuits, and base current control means for controlling the base currents of said transistors.

In this manner there can be provided a high-voltage power supply device, capable of supplying high voltages of both polarities, in an easy manner with a single transformer and without the high-voltage relay, and said power supply device is adapted for use in an image forming apparatus with limited space and cost, such as a copying machine or a printer.

The present invention is not limited to the foregoing embodiments but is subject to various modifications within the scope and spirit of the appended claims.

What is claimed is:

1. A power supply device for elevating an input voltage at a primary side with a transformer to provide a high output voltage at a secondary side, comprising:

transistors connected in parallel between respective high-voltage output terminals of plural high-voltage output circuits of different polarities formed at the secondary side of the transformer; and base current control means for controlling base currents of said transistors, wherein said plural high-voltage outputs are connected serially.

2. A power supply device according to claim 1, wherein plural high-voltage outputs, obtained at the secondary side by voltage elevation by the transformer, are released by serial connection across a resistor.

3. A power supply device according to claim 1, wherein at least one of plural high-voltage outputs, obtained at the secondary side by voltage elevation by the transformer, is provided with a resistor connected in parallel to one of the transistors connected between the terminals of said high-voltage output.

4. A power supply device according to claim 1, wherein said base current control means comprises a photocoupler.

5. A power supply device according to claim 1, wherein said base current control means comprises a transformer and a rectifying circuit.

6. An image forming apparatus comprising:

image forming means for forming an image;

transformer means for elevating an input voltage of a primary side for electric power supply to said image forming means;

plural high-voltage output circuits of different polarities, formed at a secondary side of said transformer means;

switching means connected between respective terminals of said plural high-voltage output circuits for effecting switching operation; and control means for controlling current to said switching means, wherein said plural high-voltage outputs are connected serially.

7. An image forming apparatus according to claim 6, wherein said plural high-voltage outputs are connected through a resistor.

8. An image forming apparatus according to claim 6, wherein said image forming means utilizes an electrophotographic process.

9. An image forming apparatus according to claim 6, wherein said switching means comprises a transistor.

10. An image forming apparatus according to claim 9, wherein said control means is adapted to control a base current of said transistor.

* * * * *